(12) United States Patent
Foss

(10) Patent No.: US 7,032,343 B1
(45) Date of Patent: Apr. 25, 2006

(54) ICE FISHING TIP-UP STRIKE INDICATOR

(76) Inventor: Brian Matthew Foss, 5051 16th St. SW., Hazen, ND (US) 58545

( * ) Notice: Subject to any disclaimer, the term of this patent is extended or adjusted under 35 U.S.C. 154(b) by 0 days.

(21) Appl. No.: 11/083,535

(22) Filed: Mar. 18, 2005

(51) Int. Cl.
A01K 97/12 (2006.01)

(52) U.S. Cl. .......................................... 43/17
(58) Field of Classification Search ................ 43/17
See application file for complete search history.

(56) References Cited

U.S. PATENT DOCUMENTS

| | | | |
|---|---|---|---|
| 3,201,548 A * | 8/1965 | Mertler | 337/355 |
| 3,359,673 A | 12/1967 | Roemer | |
| 3,559,327 A * | 2/1971 | Christopher | 43/17 |
| 3,913,255 A * | 10/1975 | Fillmen | 43/17 |
| 3,973,347 A * | 8/1976 | Kearney | 43/17 |
| 4,479,321 A * | 10/1984 | Welstead | 43/17 |
| 4,520,586 A | 6/1985 | Moisan | |
| 4,633,608 A | 1/1987 | Savarino | |
| 4,727,673 A * | 3/1988 | Dumar | 43/17 |
| 4,928,419 A * | 5/1990 | Forrestal | 43/17 |
| 4,996,788 A | 3/1991 | Wieting et al. | |
| 5,067,269 A * | 11/1991 | Eppley et al. | 43/17 |
| 5,097,618 A * | 3/1992 | Stoffel | 43/17 |
| 5,488,796 A * | 2/1996 | Taylor et al. | 43/17 |
| 5,894,691 A | 4/1999 | Zepeda, Sr. | |
| 5,979,101 A * | 11/1999 | Muenchow | 43/17 |
| 6,170,189 B1 | 1/2001 | Klein | |
| 6,293,043 B1 | 9/2001 | Zwettler | |
| 6,354,036 B1 | 3/2002 | Carlson et al. | |
| 6,408,561 B1 | 6/2002 | Winter | |
| 6,708,441 B1 * | 3/2004 | Dirito | 43/17 |
| 6,898,892 B1 * | 5/2005 | Senckowski | 43/16 |
| 2003/0145508 A1 | 8/2003 | Pieczynski | |

* cited by examiner

Primary Examiner—Kurt Rowan

(57) ABSTRACT

A portable indicator device for use with ice fishing tip-ups, attachable to the tip-up's articulating arm via a pinch-type clip, for enhancing the signaling capability of the tip-up. The device contains a motion-activated pendulum switch to complete the circuit between a battery and dual light and buzzer electronic alarms, enclosed within a colored, translucent housing, when the tip-up arm swings into a vertical position upon a fish strike. The pendulum switch may be easily re-set by lowering the tip-up arm to its formerly horizontal position.

11 Claims, 5 Drawing Sheets

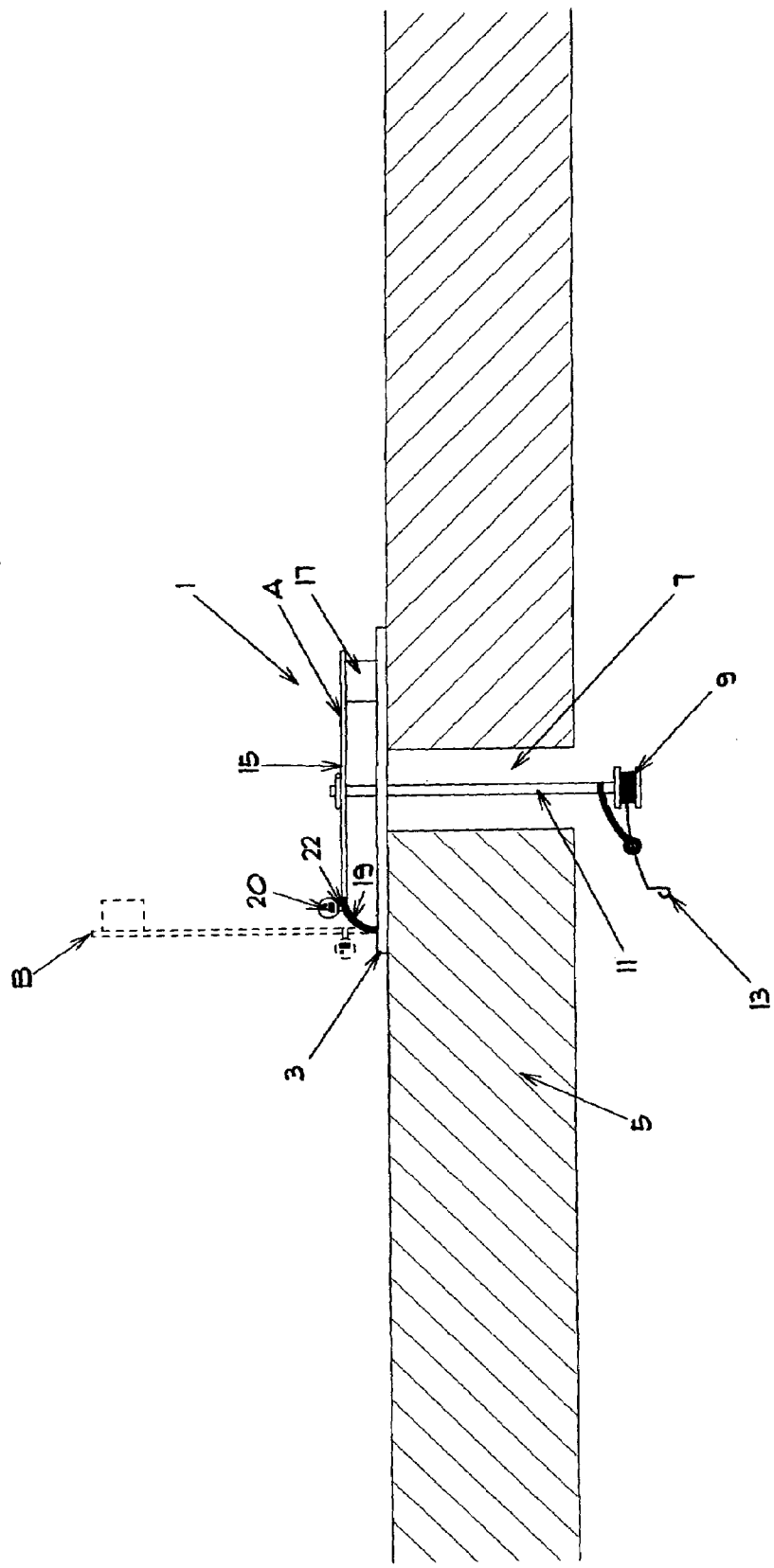

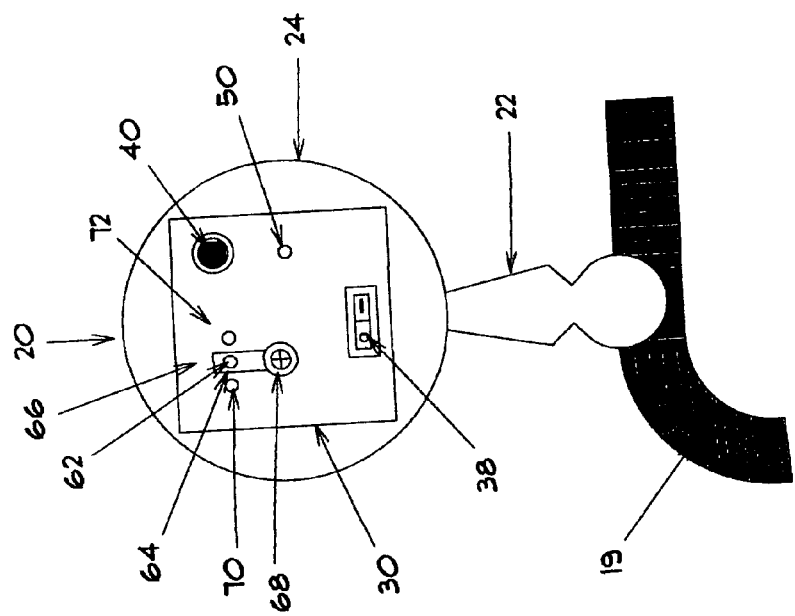

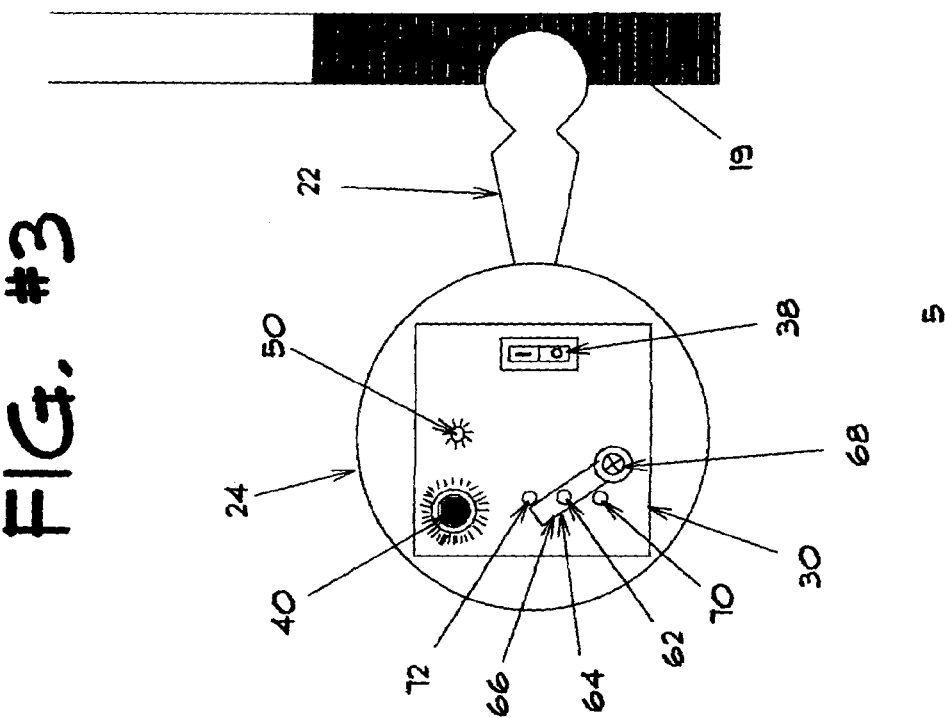

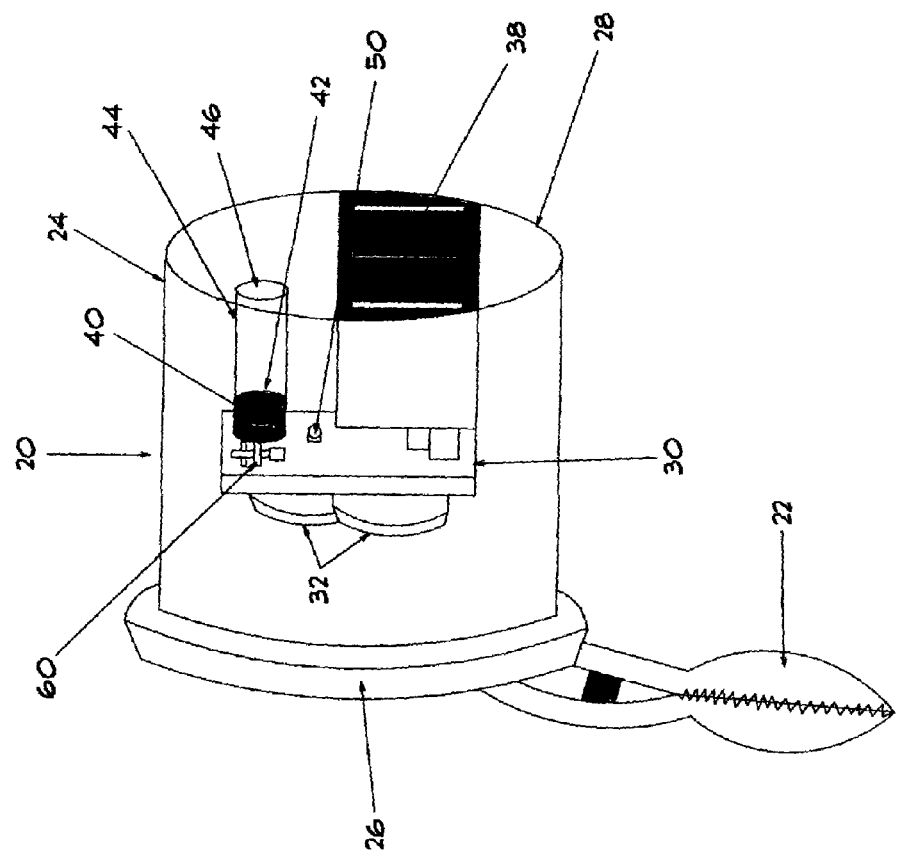

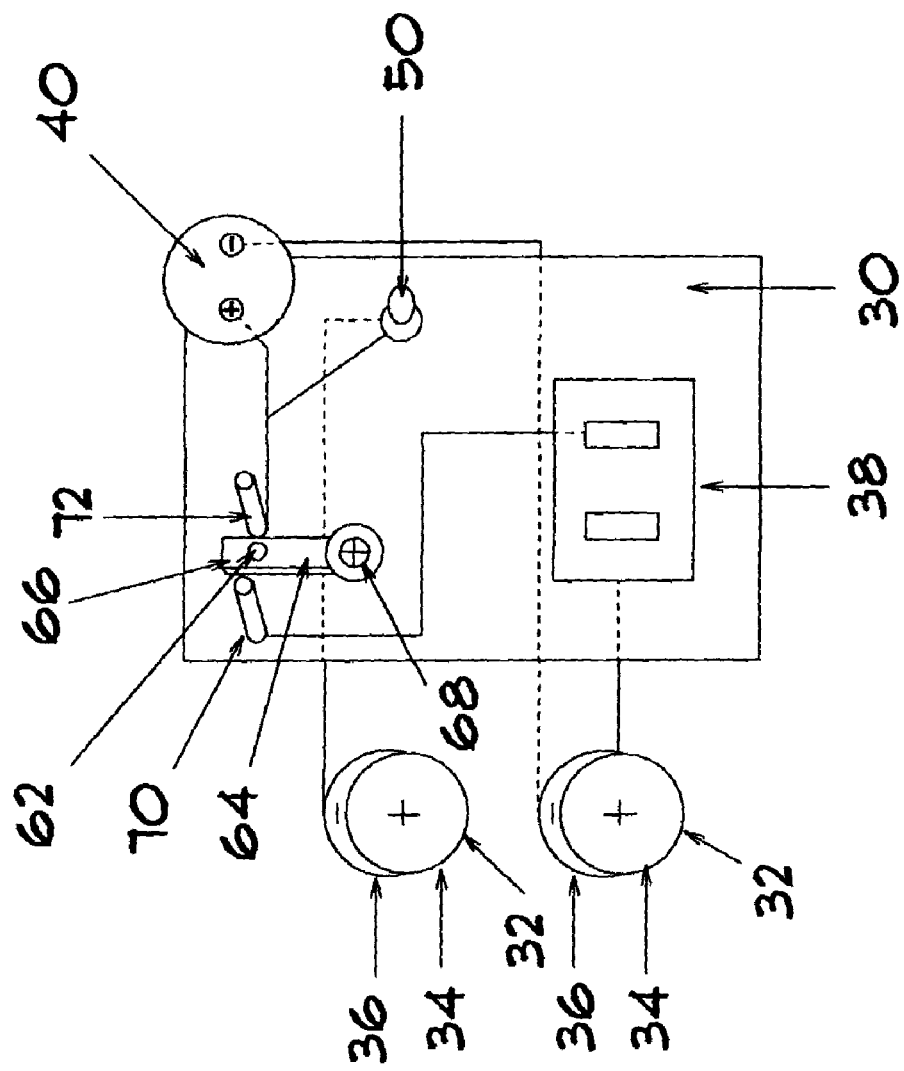
FIG. #5

ICE FISHING TIP-UP STRIKE INDICATOR

TECHNICAL FIELD

This invention relates to ice fishing signaling devices. The invention more particularly concerns a portable and attachable alarm apparatus for ice fishing tip-up devices.

BACKGROUND INFORMATION

It is recognized in the fishing alarm prior art that there are numerous means to alert sportsmen to the presence of strikes on unwatched fishing lines, including expensive radio transmitters as specified in U.S. Pat. Nos. 4,928,419 and 4,996,788. However, one of the more cost-effective alarm mechanisms used in ice fishing is the tip-up device, which commonly includes a brightly-colored flag as a primary means to effect such notice. This visual method of notice has been augmented with other electronic signaling devices, such as buzzers and/or lights that are attached to the tip-up arm at various points and utilize switches to complete a circuit between a power source, such as a battery, and the alarm mechanism when the arm swings from a generally horizontal to a generally vertical position. Examples of various embodiments of such devices may be found in U.S. Pat. Nos. 3,359,673, 5,067,269, 5,488,796, and 5,979,101. The switches used in these devices however are not optimal and present difficulties that include environmental hazards, fouling, and poor overall utility.

Those that employ a removable strip or plate as a circuit-interrupter, wherein the upward motion of the flag arm attached to the circuit-interrupter via a wire or string removes the circuit-interrupter and closes the circuit, such as described in U.S. Pat. Nos. 4,727,673 and 5,097,618, are prone to fouling in icy conditions.

Those utilizing mercury switches, such as defined in U.S. Pat. Nos. 4,928,419 and 5,488,796 for example, present an environmental hazard and may lose effectiveness over a period of time as the mercury evolves from its housing.

And those utilizing gravity-actuated ball-type switches, such as that presented in U.S. Pat. No. 5,979,101, are unreliable in that they sometimes fail to make the proper connection necessary to complete the circuit because the ball does not align in its correct position. Such switches can also be difficult to re-set for their next use and difficult to store in a non-triggered position.

There is therefore a need for a tip-up alarm system utilizing an improved switch design that is environmentally-friendly, reliable, and easy to re-use.

SUMMARY

Consistent with one aspect of the present invention, there is provided a tip-up signaling apparatus, commonly referred to in the art as a strike indicator, utilizing a motion-activated pendulum switch that completes a circuit between a battery and one or more electronic alarm devices stored in a housing therewith as the articulating arm of a standard fishing tip-up device moves from its horizontal set position to its vertical released position. Said motion-activated pendulum switch is not prone to the same drawbacks as other switches utilized in the prior art in that it is environmentally safe, unfailingly completes the circuit when the tip-up arm is in an upright position, and can be easily re-set merely by lowering the arm of the tip-up to its generally horizontal set position.

Those skilled in the art will recognize, from the preferred embodiment described below and accompanying drawings, the further utility advantages of pendulum switch strike indicators incorporating light-based signaling devices. Said indicators may be attached to the spring portion of the tip-up, along the plane of the tip-up arm, facing either forwards or backwards giving the user greater freedom to place the device in a more readily visible position.

It is the object of the invention to improve upon the reliability and utility of current tip-up alarm systems.

BRIEF DESCRIPTION OF THE DRAWINGS

These and other features and advantages of the present invention will be better understood by reading the following detailed description, taken together with the drawings wherein:

FIG. 1 diagrammatically illustrates the motion of the articulating arm of a typical commercially-available ice fishing tip-up from its horizontal set position to its vertical released position with an attached pendulum switch-incorporating strike indicator, and FIG. 2 diagrammatically illustrates a longitudinal cross-section of the pendulum-switch-incorporating strike indicator in its vertical/inactive position, and FIG. 3 diagrammatically illustrates the same longitudinal cross-section of the strike indicator of FIG. 2 when in its horizontal/active position, and FIG. 4 diagrammatically illustrates a latitudinal view of the same strike indicator showing outer housing, power switch, and clamps.

FIG. 5 diagrammatically illustrates a circuit diagram flow chart of electrical components within the strike indicator.

DETAILED DESCRIPTION OF THE PREFERRED EMBODIMENTS

Although a detailed description of the preferred embodiment is provided herein, in conjunction with the accompanying drawings, further variations in the invention are possible. Thus, while the invention has been shown in a single form, it is not so limited but is of a scope defined by the following claim language which may be broadened by an extension of the right to exclude others from making, using or selling the invention as is appropriate under the doctrine of equivalents.

With reference to the drawings, an ice fishing tip up device 1 of the type commercially available is shown in FIG. 1 incorporated for reference purposes but comprising no part of the incident invention. Such tip-up devices typically consist of a base 3 that is set on the ice 5 over a fishing hole 7. Fishing line 9 spooled around a shaft 11 in a fashion consistent with the art is attached to a baited hook 13 that is submerged below the hole 7 in the ice 5. When a fish strikes the hook 13, the fishing line 9 is reeled out releasing a flexible articulating arm 15, with attached flag 17, from its generally horizontal set position A to its vertical triggered position B.

In accordance with the incident invention, a strike indicator 20 like that illustrated in FIGS. 2 to 4 is mounted to the spring 19 of the articulating arm 15 of the ice fishing tip-up device 1 via a pinch-type clip 22. The pinch-clip 22 is affixed to the exterior of the strike indicator 20 such that when the articulating arm 15 of the tip-up 1 is in its generally horizontal set position A, the strike indicator 20 is oriented in a generally vertical direction.

FIGS. 2 and 4 illustrate the strike indicator 20 when oriented in this generally vertical direction. As seen in FIG. 4, the strike indicator container 24, which is preferably composed of translucent plastic of a bright color for better visibility in the snow, is generally cylindrical in shape and has a resealable end-cap 26. Mounted centrally inside the container 24 is a circuit board 30. Posterior to the circuit board 30 and affixed thereto, nearest the reasealable end-cap 26, are two accessible battery compartments, each housing a single battery 32, with positive 34 and negative 36 ends. Anterior to the circuit board 30 and affixed thereto, are a buzzer 40, light emitting diode (LED) 50, and motion-activated pendulum switch 60, as depicted in FIGS. 2 and 3, which consists of a pivot pin 62, electrically-conductive pivot bar 64 with unweighted 66 and weighted 68 ends, and positive 70 and negative 72 contact posts. Hollow plastic tubing 44 connects the speaker end 42 of the buzzer 40 to a hole 46 in the anterior wall 28 of the container 24 to allow better sound conductivity to the exterior. Attached to the anterior wall 28 of the container 24, facing outward, is an ON-OFF power switch 38.

As denoted in FIG. 5, circuitry leads from the positive end 34 of each of the two batteries 32 through the ON-OFF power switch 38, which allows the strike indicator 20 to be turned OFF during periods of disuse to prevent power drainage, to the positive contact post 70 of the motion-activated pendulum switch 60. Separate leads connect the negative ends 36 of the batteries 32 to the LED 50 and buzzer 40 individually, allowing each to be powered or disabled independently by removing the associated battery 32 as conditions warrant (i.e. during daylight hours the LED may be powered down to conserve battery life without altering the effectiveness of the buzzer). The circuit connecting the LED 50 and the circuit connecting the buzzer 40 join and connect to the negative contact post 72 of the motion-activated pendulum switch 60.

When the strike indicator is oriented in a generally vertical direction, as shown in FIG. 2, the pivot bar 64 of the motion-activated pendulum switch 60 hangs freely in a vertical direction, weighted end 68 down, between the positive 70 and negative 72 contact pins. When the strike indicator 20 is tipped to a generally horizontal position as the flag arm 15 of the tip-up 1 springs to a vertical triggered position B, the pivot bar 64 of the pendulum switch 60 swings in a semi-circular motion, coming to rest against both positive 70 and negative 72 contact posts, as depicted in FIG. 3, completing the circuit and powering the LED 50 and buzzer 40. Resetting the strike indicator 20 is as simple as lowering the flag arm 15 to its formerly horizontal position A, thereby returning the pivot bar 64 to a vertical position and breaking the circuit.

To those skilled in the art, the advantages of a strike indicator incorporating a motion-activated pendulum switch will be apparent. Encased within a weather-resistant container, the pendulum switch and associated alert systems make the strike indicator environmentally-friendly, versatile, easy to use, and free of many of the failings associated with other ice-fishing tip-up alert systems.

While the preferred embodiment of the invention has been shown and described, the intention is not to limit its scope to only that form which has been presented. Alternatives and modifications obvious to those skilled in the art consistent with the spirit and broader aspects of the invention are intended to be covered by the appended claims.

What is claimed is:

1. An ice fishing strike indicator device comprising:
   a container;
   a circuit board enclosed within said container;
   a power source enclosed within said container connected in circuit with said circuit board;
   an alarm mechanism enclosed within said container; and
   a pendulum switch positioned in circuit between said power source and said alarm mechanism, wherein said pendulum switch further comprises:
   a pivot pin secured to said circuit board;
   a pivot bar having weighted and unweighted ends pivotally mounted on said pivot pin such that when said ice fishing strike indicator device is in a horizontal position said pivot bar hangs freely in a vertical direction with said weighted end downward; and
   one or more contact points secured to said circuit board positioned such that when said ice fishing strike indicator device is in a horizontal position said contact points do not touch said pivot bar, but do touch when said ice fishing strike indicator device is tipped vertically.

2. An ice fishing strike indicator device as claimed in claim 1 wherein said pivot pin, said pivot bar, and said contact points are composed of an electrically conductive material.

3. An ice fishing strike indicator device as claimed in claim 1 wherein said pivot pin is connected in circuit with said power source; and
   one or more of said contact points is connected in circuit to said alarm mechanism.

4. An ice fishing strike indicator device as claimed in claim 1 wherein said pivot pin is not connected in circuit;
   one or more of said contact points is connected in circuit with said power source; and
   one or more of said contact points is connected in circuit with said alarm mechanism.

5. An ice fishing strike indicator device as claimed in claim 1 wherein said container is composed of a weather-resistant, light-weight, translucent material.

6. An ice fishing strike indicator device as claimed in claim 1 wherein said container is colored to enhance its visibility.

7. An ice fishing strike indicator device as claimed in claim 1 further comprising a clamping device for attaching to the spring arm of an ice fishing tip-up device.

8. An ice fishing strike indicator device as claimed in claim 1 wherein said power source is one or more batteries.

9. An ice fishing strike indicator device as claimed in claim 1 wherein said container further comprises a removable cover for replacement of said batteries.

10. An ice fishing strike indicator device as claimed in claim 1 wherein said alarm mechanism comprises:
    a signal light; and
    a buzzer.

11. An ice fishing strike indicator device as claimed in claim 1 wherein said container is composed of plastic.

* * * * *